(12) United States Patent
Donderici et al.

(10) Patent No.: US 10,982,529 B2
(45) Date of Patent: Apr. 20, 2021

(54) INCORPORATING MANDREL CURRENT MEASUREMENTS IN ELECTROMAGNETIC RANGING INVERSION

(71) Applicant: Halliburton Energy Services, Inc., Houston, TX (US)

(72) Inventors: Burkay Donderici, Pittsford, NY (US); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 28 days.

(21) Appl. No.: 16/343,825

(22) PCT Filed: Jan. 31, 2017

(86) PCT No.: PCT/US2017/015843
§ 371 (c)(1),
(2) Date: Apr. 22, 2019

(87) PCT Pub. No.: WO2018/143946
PCT Pub. Date: Aug. 9, 2018

(65) Prior Publication Data
US 2019/0338633 A1 Nov. 7, 2019

(51) Int. Cl.
*E21B 47/022* (2012.01)
*E21B 49/00* (2006.01)
(Continued)

(52) U.S. Cl.
CPC .......... *E21B 47/0228* (2020.05); *E21B 49/00* (2013.01); *G01V 3/28* (2013.01); *E21B 43/2406* (2013.01); *E21B 47/12* (2013.01)

(58) Field of Classification Search
CPC ....... G01V 3/28; E21B 47/0228; E21B 49/00; E21B 43/2406; E21B 47/12; E21B 47/13; E21B 47/09
See application file for complete search history.

(56) References Cited

U.S. PATENT DOCUMENTS

| | | |
|---|---|---|
| 3,793,632 A | 2/1974 | Still |
| 5,339,037 A | 8/1994 | Bonner et al. |
| (Continued) | | |

FOREIGN PATENT DOCUMENTS

| | | |
|---|---|---|
| CA | 2254490 | 8/1999 |
| EP | 0295178 | 12/1988 |
| (Continued) | | |

OTHER PUBLICATIONS

ISRWO International Search Report and Written Opinion for PCT/US2017/015843 dated Oct. 20, 2017.
(Continued)

*Primary Examiner* — Huy Q Phan
*Assistant Examiner* — Zannatul Ferdous
(74) *Attorney, Agent, or Firm* — Benjamin Ford; C. Tumey Law Group PLLC

(57) ABSTRACT

Systems and methods for incorporating mandrel current measurements in deep ranging inversion. A method may include introducing a current through a transmitter into a subterranean formation, wherein the transmitter may be a component of an electromagnetic induction tool disposed in a wellbore, wherein the electromagnetic induction tool may comprise the transmitter, a toroid receiver, and a second receiver comprising a coil or electrode, wherein the transmitter, the toroid receiver, and the second receiver may be disposed on a tubular; measuring a first signal utilizing the toroid receiver, wherein the first signal may comprise a tubular current; measuring a second signal utilizing the receiver and determining at least one downhole parameter utilizing the first signal and the second signal.

18 Claims, 5 Drawing Sheets

(51) Int. Cl.
*G01V 3/28* (2006.01)
*E21B 47/0228* (2012.01)
*E21B 43/24* (2006.01)
*E21B 47/12* (2012.01)

(56) References Cited

U.S. PATENT DOCUMENTS

| | | |
|---|---|---|
| 2009/0066336 A1 | 3/2009 | Dion |
| 2010/0176812 A1* | 7/2010 | Bittar .............. G01V 3/24 324/339 |
| 2013/0057287 A1 | 3/2013 | Le et al. |
| 2013/0226459 A1 | 8/2013 | Gorek |
| 2014/0285204 A1* | 9/2014 | Okonkwo ............. E21B 47/017 324/333 |
| 2014/0350857 A1* | 11/2014 | Denaclara ............. G01V 1/003 702/6 |
| 2014/0350858 A1 | 11/2014 | Donderici |
| 2015/0034312 A1 | 2/2015 | McElhinney et al. |
| 2016/0102529 A1 | 4/2016 | DiSantis et al. |
| 2016/0273341 A1* | 9/2016 | Wu .......................... E21B 33/14 |
| 2017/0176629 A1* | 6/2017 | Omeragic ................ G01V 3/28 |
| 2017/0371072 A1* | 12/2017 | Shetty .................. G01V 99/005 |
| 2018/0059281 A1* | 3/2018 | Arro ....................... G01V 11/00 |
| 2018/0209265 A1* | 7/2018 | Fouda ................... E21B 47/135 |
| 2019/0302058 A1* | 10/2019 | Khalaj Amineh ..... G01N 27/02 |

FOREIGN PATENT DOCUMENTS

| | | |
|---|---|---|
| EP | 0541425 | 5/1993 |
| WO | 2014120556 | 8/2014 |
| WO | 2016025230 | 2/2016 |
| WO | 2017192148 | 11/2017 |

OTHER PUBLICATIONS

Canadian Examination Search Report for Application No. 3,047,238 dated Dec. 16, 2020.

* cited by examiner

INCORPORATING MANDREL CURRENT MEASUREMENTS IN ELECTROMAGNETIC RANGING INVERSION

BACKGROUND

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") operation, wherein the second wellbore may be an injection wellbore while the target wellbore may be a production wellbore. Yet another application may be where knowledge of the target wellbore's location may be needed to avoid collision during drilling of the second wellbore.

Electromagnetic ranging tools may be employed in subterranean operations to determine direction and distance between two wellbores. Electromagnetic ranging tools may use different techniques to obtain current on a conductive member in the target wellbore. Approaches may include directly injecting a current into the conductive member and/or inducing a current on a conductive member by transmitting electromagnetic fields by coil antennas positioned in a second wellbore. The induced current in turn may cause the casing to radiate a secondary electromagnetic field. In another approach, an electrode type source may be used to induce current on the conductive member. The gradient of the magnetic field radiated by the conductive member in addition to the magnetic field itself may be measured. Using a relationship between the magnetic field and its gradient, a ranging measurement may be calculated. Alternatively, an inversion may be used to determine the range, in which a forward model of the signal that may be received at the ranging tool may be needed. The inversion process may try to find the formation and well parameters that would match the forward model with the measurements made by the tool.

BRIEF DESCRIPTION OF THE DRAWINGS

These drawings illustrate certain aspects of some examples of the present disclosure, and should not be used to limit or define the disclosure.

DETAILED DESCRIPTION

Figure 1:
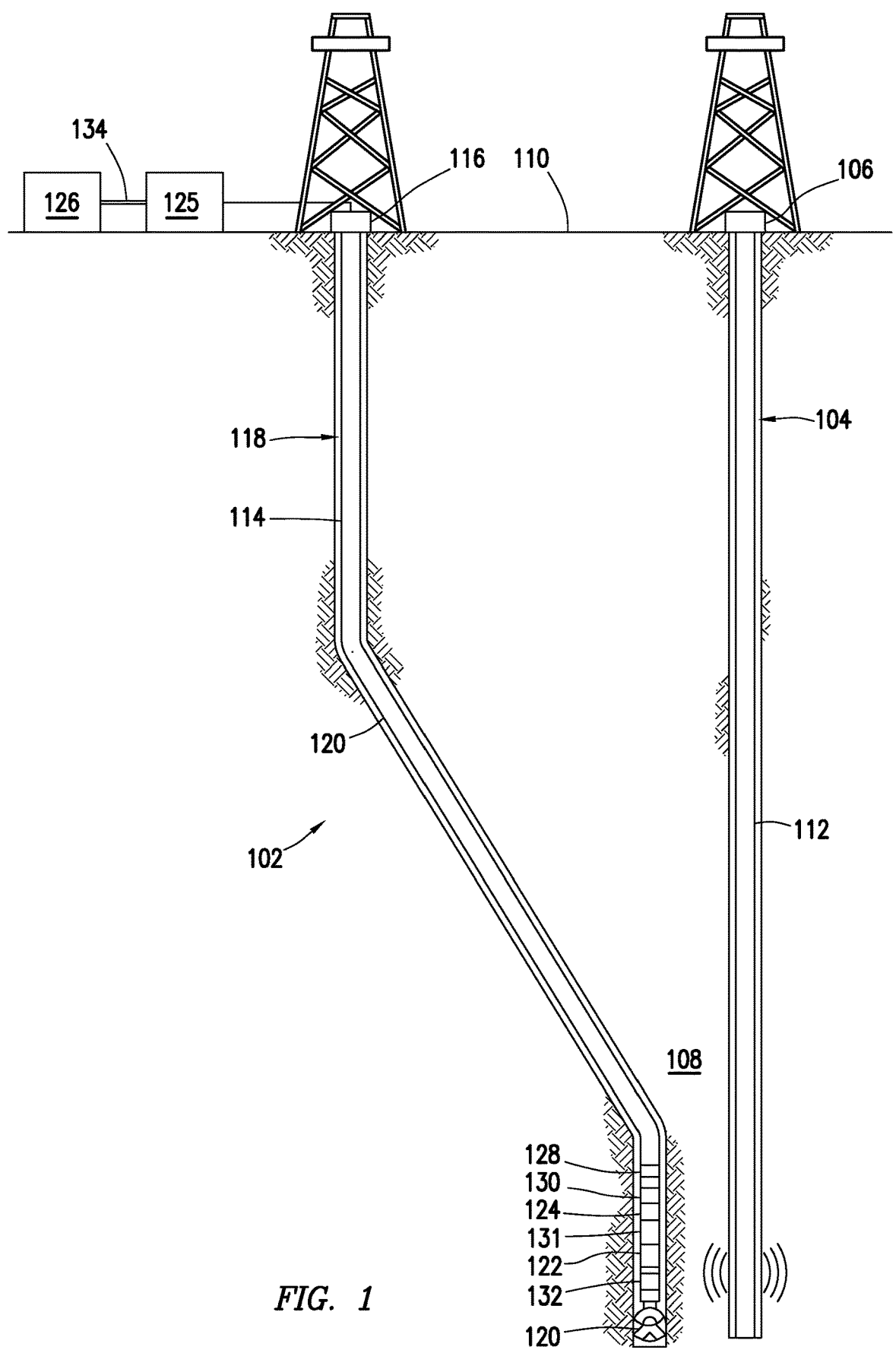
FIG. 1 is a schematic illustration of an example of an electromagnetic ranging system in a wellbore.

This disclosure may generally relate to systems and methods for electromagnetic ranging. While the present techniques may be applicable to any number of monitoring applications, they may be particularly application to logging-while-drilling (LWD), measuring-while-drilling (MWD), wireline logging, electromagnetic (EM) ranging, and permanent reservoir monitoring applications. Specifically, the present technique may introduce methods of improving inversion algorithms of electromagnetic induction tools by including certain current measurements along a tubular on which the tool resides. Depending on the application, the tubular may be the drill collar on a bottom-hole assembly (BHA), a wireline tool mandrel, or a production casing joint, among others. As disclosed herein, the term "electromagnetic induction tool" may denote any electromagnetic tool which works at least in part based on induction principles. The term "electromagnetic induction tool" is not intended to limit the application to subterranean formation resistivity measurement and specifically includes ranging applications, where a distance and/or direction to a target wellbore may be calculated.

In electromagnetic induction tools, the mandrel current may often be a prominent constituent of an overall tool model. The mandrel current may be created on conductive mandrels by electrostatic means or through magnetic induction. Although, the mandrel current may often be a source of undesired coupling between a transmitter and a receiver, the mandrel current may be an additional source of information to an inversion algorithm of the electromagnetic induction tool. The mandrel current may be determined by many factors in an environment, including model parameters that an electromagnetic induction tool may be designed to find (downhole parameters, such as, for example: formation resistivity, distance to bed boundary, and/or distance to target well). This dependence may be physically distinct from the dependence of the received signal (for example: voltage, coil current, and/or magnetic field) on the same model parameters. The mandrel current may therefore be a source of new, readily accessible information. Measurement of the mandrel current may provide a new perspective from which the model parameters may be viewed, and may increase the robustness of the inversion algorithm that may compute them. This may be even more important in a deep well interception or avoidance application where formation resistivity may be a relevant parameter in addition to the conventional well orientation and position related parameters.

The mandrel current may be measured near a receiver; although, this may not strictly be required. However, it may be more practical to do so; as it may be easier to incorporate a current measurement apparatus into an existing receiver design, rather than designing a separate component elsewhere along the mandrel. The mandrel current may be measured utilizing a toroidal receiver. By way of example, the toroidal receiver may comprise a toroidal coil (toroid) wrapped around the mandrel. The voltage on the toroidal coil may then be measured.

The mandrel current may also be utilized as a stable reference for the amount of excitation. A reference (or normalization) value may be necessary to normalize the receiver signals, and the reference may be a transmitter voltage or current. However, there may be cases where the transmitter voltage or current may be too sensitive to the parameters to be inverted. For example, a conductive well, conductive formation layer, or other conductive inhomogeneity may draw extra current from an excitation electrode. The mandrel current, however, may be less affected by these local disturbances. It may, therefore, serve as a more reliable indicator of the amount of excitation, and a more stable normalization factor in the inversion algorithm.

An electromagnetic ranging system may comprise an electromagnetic induction tool, which may comprise a toroid receiver, a transmitter, and/or a second receiver. The transmitter and/or second receiver may include toroids, coils and/or electrodes. Transmission of electromagnetic fields by the transmitter and the recordation of signals by the receiver, may be controlled by an information handling system, which may be located within the electromagnetic induction tool and/or corresponding surface equipment.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates an electromagnetic ranging system 102. As illustrated, a target wellbore 104 may extend from a first wellhead 106 into a subterranean formation 108 from a surface 110. Generally, target wellbore 104 may include horizontal, vertical, slanted, curved, and other types of wellbore geometries and orientations. Target wellbore 104 may be cased or uncased. A conductive member 112 may be disposed within target wellbore 104 and may comprise a metallic material that may be conductive and magnetic. By way of example, conductive member 112, which may also be magnetic, may be a casing, liner, tubing, or other elongated steel tubular disposed in target wellbore 104. Determining the position and direction of target wellbore 104 accurately and efficiently may be required in a variety of applications. For example, target wellbore 104 may be a "blowout" well. Target wellbore 104 may need to be intersected precisely by a second wellbore 114 in order to stop the "blowout." Alternatively, it may be desired to avoid collision with target wellbore 104 in drilling second wellbore 114 or it may be desired to drill the second wellbore parallel to the target wellbore 104, for example, in SAGD applications. In examples, target wellbore 104 may not be accessible and/or information about the position and structure of target wellbore 104 may not be available. As will be discussed in more detail, electromagnetic ranging system 102 may be used for determining the location of target wellbore 104 with respect to second wellbore 114.

With continued reference to FIG. 1, second wellbore 114 may also extend from a second wellhead 116 that extends into subterranean formation 108 from surface 110. Generally, second wellbore 114 may include horizontal, vertical, slanted, curved, and other types of wellbore geometries and orientations. Additionally, while target wellbore 104 and second wellbore 114 are illustrated as being land-based, it should be understood that the present techniques may also be applicable in offshore applications. Second wellbore 114 may be cased or uncased. In examples, a conveyance 118 may begin at second wellhead 116 and traverse second wellbore 114. A drill bit 120 may be attached to a distal end of conveyance 118 and may be driven, for example, either by a downhole motor and/or via rotation of conveyance 118 from surface 110. Drill bit 120 may be a part of bottom hole assembly 122 at distal end of conveyance 118. While not illustrated, bottom hole assembly 122 may further comprise one or more of a mud motor, power module, steering module, telemetry subassembly, and/or other sensors and instrumentation as will be appreciated by those of ordinary skill in the art. As will be appreciated by those of ordinary skill in the art, bottom hole assembly 122 may be a measurement-while drilling (MWD) or logging-while-drilling (LWD) system.

Electromagnetic ranging system 102 may comprise an electromagnetic induction tool 124. Electromagnetic induction tool 124 may be operatively coupled to conveyance 118 (wireline, slickline, coiled tubing, pipe, drill pipe, downhole tractor, or the like) which may provide electrical connectivity, as well as mechanical suspension, for electromagnetic induction tool 124.

Electromagnetic induction tool 124 may be a part of bottom hole assembly 122. The electromagnetic induction tool 124 may be operated in real-time, including downhole processing for a range and direction to a target wellbore 104, which may allow integration with survey data. Electromagnetic induction tool 124 may be used for determining the distance and direction to target wellbore 104. Additionally, electromagnetic induction tool 124 may be connected to and/or controlled by information handling system 126, which may be disposed on surface 110. In examples, information handling system 126 may communicate with electromagnetic induction tool 124 through a communication line (not illustrated) disposed in (or on) conveyance 118. In examples, wireless communication may be used to transmit information back and forth between information handling system 126 and electromagnetic induction tool 124. Information handling system 126 may transmit information to electromagnetic induction tool 124 and may receive as well as process information recorded by electromagnetic induction tool 124. In addition, electromagnetic induction tool 124 may include a downhole information handling system 128, which may also be disposed on bottom hole assembly 122. Downhole information handling system 128 may include, a microprocessor or other suitable circuitry, for estimating, receiving and processing signals received by the electromagnetic induction tool 124. Downhole information handling system 128 may further include additional components, such as memory, input/output devices, interfaces, and the like. While not illustrated, the electromagnetic induction tool 124 may include one or more additional components, such as analog-to-digital converter, filter and amplifier, among others, that may be used to process the measurements of the electromagnetic induction tool 124 before they may be transmitted to surface 110. Alternatively, raw measurements from electromagnetic induction tool 124 may be transmitted to surface 110.

In examples, electromagnetic induction tool 124 may comprise a transmitter 130, toroidal receiver 131 and/or a second receiver 132. It should be noted that electromagnetic induction tool 124 may comprise a plurality of transmitters 130 and/or a plurality of toroidal receivers 131 and/or a plurality of second receivers 132. The plurality of transmitters 130, the plurality of toroidal receivers 131, and the plurality of receivers 132 may be disposed along a longitudinal axis of the electromagnetic induction tool 124. Any of a variety of different transmitters 130 and second receivers 132 for generating and measuring electromagnetic fields may be suitable for use, including, but not limited to, coil antenna, wire antenna, toroidal antenna and/or azimuthal button electrodes. Magnetometers may also be used as the second receiver 132.

Any suitable technique may be used for transmitting signals from electromagnetic induction tool 124 to surface 110, including, but not limited to, wired pipe telemetry, mud-pulse telemetry, acoustic telemetry, and electromagnetic telemetry. While not illustrated, bottom hole assembly 122 may include a telemetry subassembly that may transmit telemetry data to the surface. A transmitter in the telemetry subassembly may be operable to generate pressure pulses in the drilling fluid that propagate along the fluid stream to surface 110. At surface 110, pressure transducers (not shown) may convert the pressure signal into electrical signals for a digitizer 125. Digitizer 125 may supply a digital form of the telemetry signals to information handling system 126 via a communication link 134, which may be a wired or wireless link. The telemetry data may be analyzed and processed by information handling system 126. For example, the telemetry data could be processed to determine location of target wellbore 104. With the location of target wellbore 104, a driller could control the bottom hole assembly 122 while drilling second wellbore 114 to intentionally intersect target wellbore 104, avoid target wellbore 104, and/or drill second wellbore 114 in a path parallel to target wellbore 104.

Figure 2C:
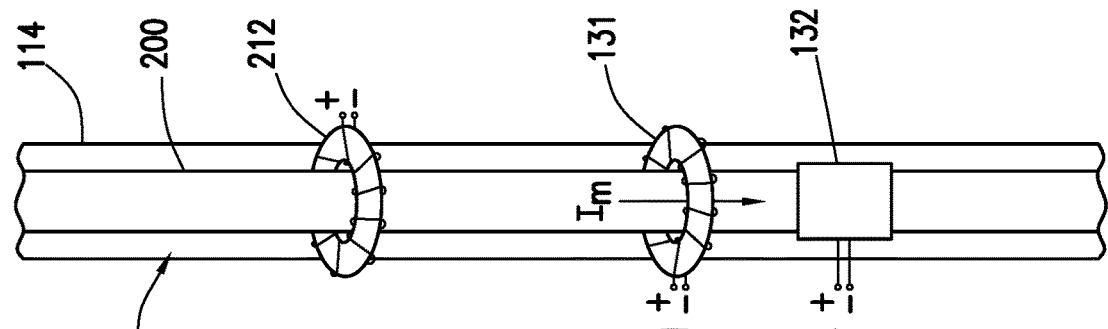
FIGS. 2A to 2C are schematic illustrations of various example configurations where the measurement of mandrel current may be utilized in accordance with systems and methods of the present disclosure.
Figure 2B:
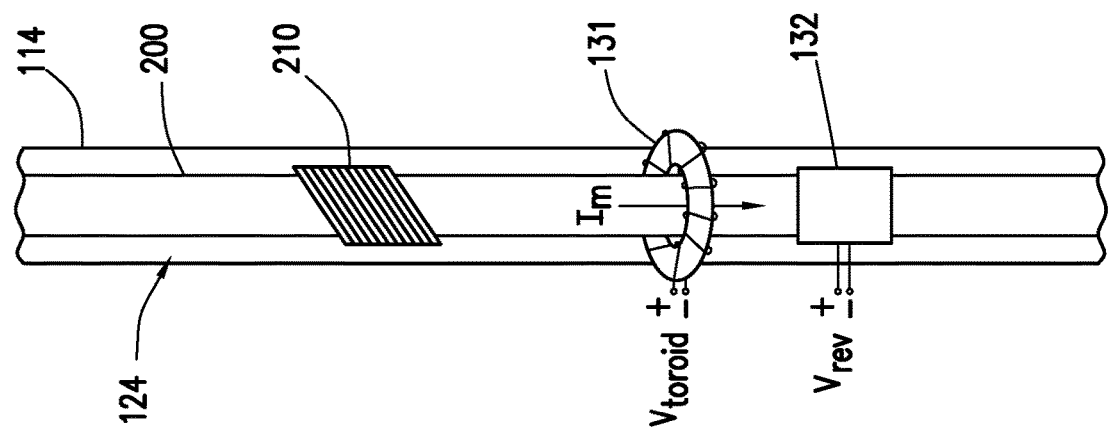
Figure 2A:
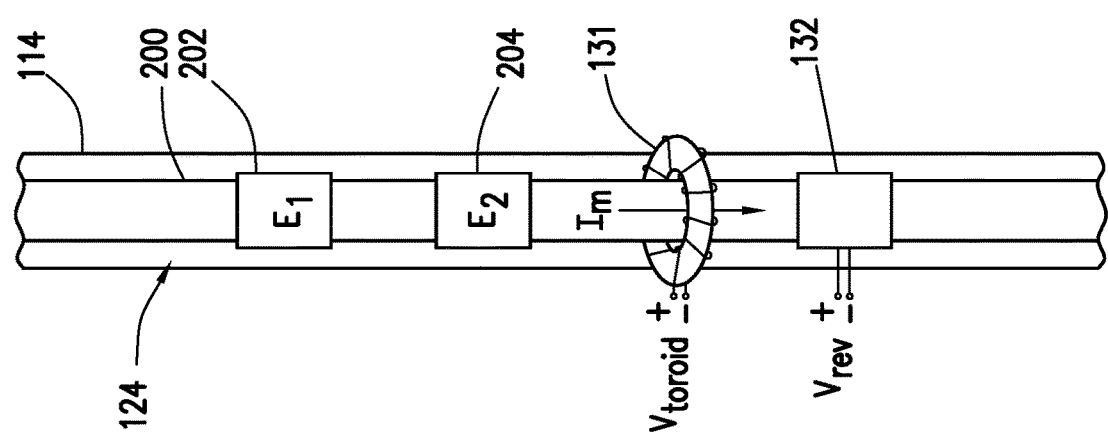

FIGS. 2A-2C illustrate various configurations where the measurement of mandrel current may be utilized according to systems and methods of the present disclosure. In FIGS. 2A-2C, a certain axial section of a tubular 200 of an electromagnetic induction tool 124 (wireline tool) is illustrated in a downhole environment. The tubular 200 may be a conductive metallic section of the electromagnetic induction tool 124, and the toroid receiver 131 may be mounted on the tubular 200 and isolated between a surface of the tubular 200 and wires of the toroid receiver 131. Components such as, for example, toroid receiver 131, second toroid 212 and tilted solenoid 210 are illustrated to be outside the tubular 200 (i.e., extruding from tubular 200). It should be noted that FIGS. 2A-2C are example illustrations, show that the placement of toroid receiver 131, second toroid 212 and tilted solenoid 210 may be positioned on the outside of tubular 200, however, toroid receiver 131, second toroid 212 and tilted solenoid 210 may be positioned in a groove on the tubular 200, or inside the tubular 200.

The tubular 200 may be situated in the second wellbore 114 that has been previously drilled or is currently being drilled. Alternatively, the tubular 200 may be a casing joint or a mandrel of a wireline tool. If this is an open hole, the tubular 200 may be embedded in drilling mud, which may fill the annular region between the mandrel surface and the second wellbore 114. In FIG. 2A, electrode 202 and electrode 204 on the tubular 200 (one of the electrodes out of electrodes 202 and 204 may be source, the other may be return) may serve as the transmitter (e.g., transmitter 130 on FIG. 1). Electrodes 202 and 204 may be wire connections that may be internal or external to tubular 200.

The mandrel current may be measured by a toroid receiver 131 near the second receiver 132, mounted on the tubular 200 with isolation between the mandrel surface and the wires of the toroid receiver 131. The second receiver 132 may include, magnetometer or a (non-toroidal) induction coil with its axis tilted with respect to the tubular axis. The toroid receiver 131 may preferably be located within a few receiver lengths from the second receiver 132, but this may not be necessary. The toroid receiver 131 may be located within about 50 feet of the second receiver 132. Incorporating the toroid receiver 131 into the existing receiver design may offer a practical advantage, but the location of the toroid receiver 131 may not be conceptually limited to near the second receiver 132. In FIG. 2B, the geometry may be the same as that in FIG. 2A, except the transmitter 130 may be a tilted solenoid 210 with an arbitrary tilt angle and azimuthal orientation. In FIG. 2C, the transmitter 130 may be a second toroid 212. A first signal (tubular current) may be measured using the toroid receiver 131 and a second signal may be measured using the second receiver 132, which may be a coil or electrode. Signals may refer to voltage, current, impedance, electric field or magnetic field, all of which may be complex-valued (represented as amplitude and phase) quantities. Both measurements may be taken at frequencies above 100 Hz. Additionally, both measurements may be taken at the same or different frequencies. The first signal and the second signal may then be utilized to determine at least one downhole parameter. Non-limiting examples of downhole parameters, include: formation resistivity, distance to bed boundary, and/or target well parameters, such as distance to target wellbore 104.

Figure 3:
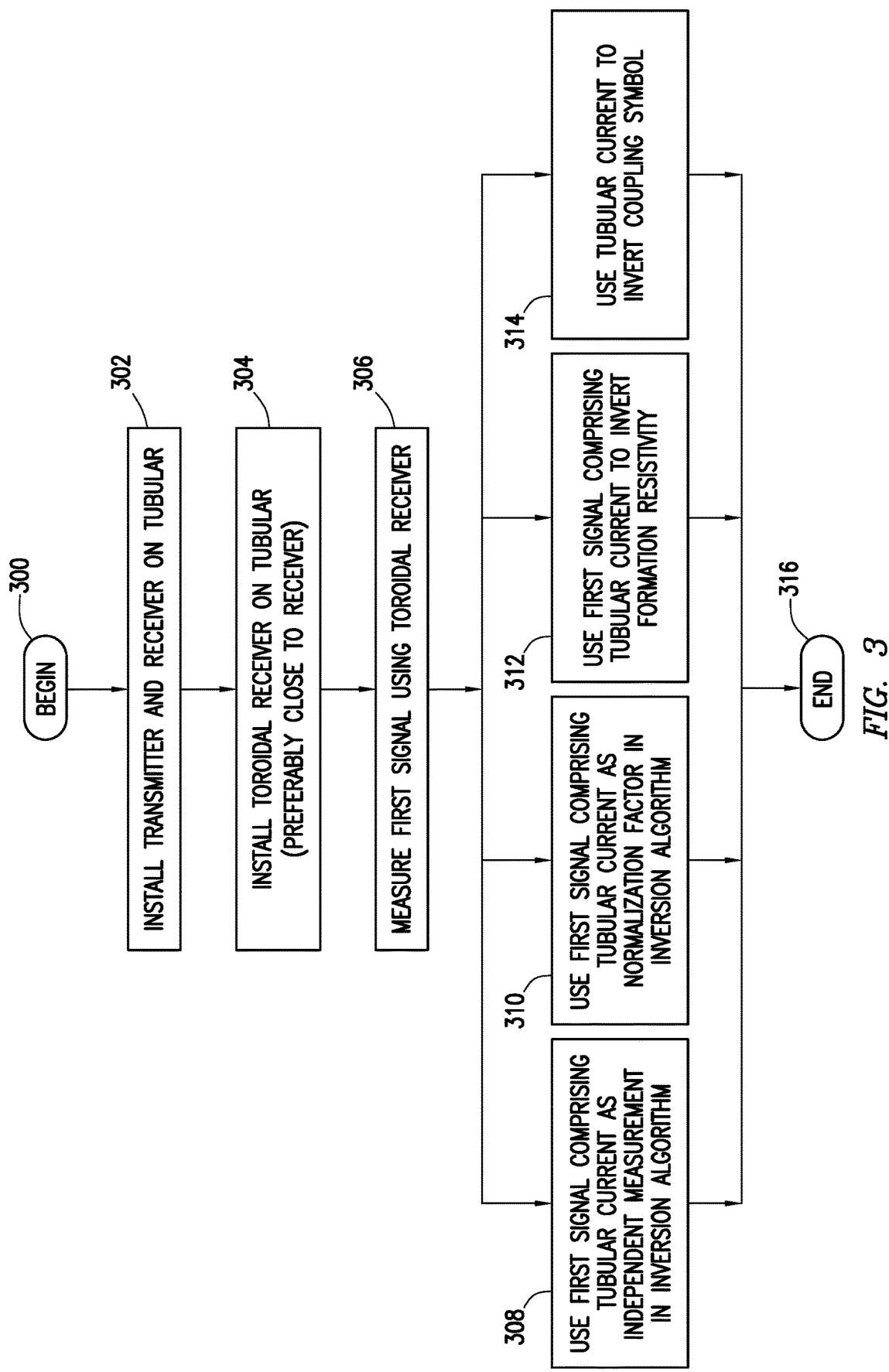
FIG. 3 illustrates an example of a workflow associated with systems and methods of the present disclosure.

FIG. 3 illustrates an example workflow in accordance with systems and methods of this disclosure. The workflow may begin with box 300. Box 302 may provide installing a transmitter 130 (e.g., shown on FIG. 1) and second receiver 132 (e.g., shown on FIG. 1) on a tubular 200 (e.g., shown on FIG. 2). Box 304 may provide installing a toroid receiver 131 (e.g., shown on FIG. 1) on the tubular 200. As previously described, the toroid receiver 131 may be placed in proximity to the second receiver 132. Box 306 may provide measuring a first signal using the toroid receiver 131. The first signal may be a measurement of the tubular current. The first signal comprising the tubular current may be utilized in a number of different ways in the inversion. Box 308 may provide using the first signal comprising tubular current as an independent measurement in an inversion algorithm. Box 310 may provide using the first signal comprising the tubular current as a normalization factor in an inversion algorithm. Box 312 may provide using the first signal comprising tubular current to invert formation resistivity. Box 314 may provide using tubular current to invert a coupling signal. Box 316 may provide the end of the workflow. Each of Boxes 306 to 312 will be described in more detail in the following sections.

At box 306, a first signal may be measured using the toroid receiver 131. A toroid receiver 131 may register an open-circuit voltage across its terminals, denoted as $V_{toroid}$.

This voltage may be related to a tubular (or mandrel) current $I_m$ at the location of the toroid receiver 131 by the expression:

$$I_m = \frac{2\pi r}{j\omega\mu NA} V_{toroid} \quad (1)$$

where r is the radius of the toroid receiver 131 from the tubular axis, N is the number of turns of the toroid receiver 131, A is the tube area of the toroid receiver 131, μ is the permeability of the toroid receiver 131 core, and ω is the frequency. The tubular (or mandrel) current $I_m$ may be obtained from $V_{toroid}$ using the above formula. If the open-circuit voltage $V_{toroid}$ cannot be measured directly (due to, for example, low input impedance of attached circuitry), the total wire resistance ($R_{toroid}$) of the toroid receiver 131 and its inductance ($L_{toroid} = \mu NA/2\pi r$) may be used to back-calculate it from the toroid receiver's terminal voltage using a Thevenin equivalent circuit. The second receiver 132 may measure a second signal, denoted as $V_{rcv}$, which may be in terms of voltage, current, or magnetic field, for example. The second signal may be measured at a different axial location than the toroid receiver.

At least one downhole parameter may be determined using a ratio of the second signal and the first signal. Modeling may be used to determine an effect of the first signal on the second signal; subtracting the effect from the second signal to obtain a corrected second signal; and using the corrected second signal in the step of determining the at least one downhole parameter. A downhole model may be considered, wherein the downhole model comprises a modeled tubular current. An inversion may be solved to provide at least one downhole parameter, wherein the inversion minimizes a difference between the modeled tubular current and the first signal and minimizes a difference between the modeled receiver signal and the second signal. A mathematical model, constructed by an inversion algorithm to reproduce the measurements, may yield a modeled receiver signal $V_{rcv,m}$. This model may be found by iteratively updating an initial model until $V_{rcv,m}$ sufficiently approximates $V_{rcv}$. This may be done by applying a numerical optimization algorithm operating on the basis of minimizing a cost function $F(V_{rcv}, V_{rcv,m})$, a scalar measure of how much the modeled receiver signal may differ from the measured signal. An algorithm may be a nonlinear least-squares optimization, where the cost function is:

$$F(V_{rcv}, V_{rcv,m}) = \left| \frac{V_{rcv} - V_{rcv,m}}{\alpha_{ref}} \right|^2 \quad (2)$$

where $\alpha_{ref}$ is the normalization factor, which may eliminate the effect of excitation strength on the inversion.

At box 308, the method may provide using the first signal comprising tubular current as an independent measurement in an inversion algorithm. The tubular (or mandrel) current $I_m$ included in the cost function (2):

$$F(V_{rcv}, V_{rcv,m}) = \left| \frac{V_{rcv} - V_{rcv,m}}{\alpha_{ref}} \right|^2 + \left| \frac{I_m - I_{m,m}}{\beta_{ref}} \right|^2 \quad (3)$$

Here, $I_{m,m}$ may be the modeled tubular current, the current predicted by the mathematical model employed by the inversion. The cost function in (3) may force the inversion algorithm to bring $I_m$ close to $I_{m,m}$, just as much as it tries to bring $V_{rcv}$ close to $V_{rcv,m}$. If the number of model parameters to be inverted stays the same, the addition of the second term in (3) may result in an overdetermined system. More information may be used to deduce the same amount of model parameters, and the inversion quality may improve as a result. The normalization factor $\beta_{ref}$ may be different from $\alpha_{ref}$, since the received signal $V_{rcv}$ and the mandrel current $I_m$ may have different units. Even if they do have the same units, it may be advisable to adjust $\alpha_{ref}$ and $\beta_{ref}$ relative to each other so that the first and second terms in (3) have comparable amplitudes. This amplitude balancing may ensure that inversion does not favor either term in (3).

At box 310, the method may provide using the first signal comprising the tubular current as a normalization factor in an inversion algorithm. $\alpha_{ref}$ in the cost function (2) may be taken to be equal or proportional to the tubular (or mandrel) current $I_m$:

$$F(V_{rcv}, V_{rcv,m}) = \left| \frac{V_{rcv} - V_{rcv,m}}{\alpha'_{ref} I_m} \right|^2 \quad (4)$$

where $\alpha'_{ref}$ may be a numeric constant that may put limits on the overall amplitude of the cost function. $I_m$ may be chosen as a normalization factor may be that it may be a more stable indicator of the amount of excitation. Current from a transmitter 130, such as electrodes 202, 204, may fluctuate if there is a conductive well (e.g., target wellbore 104), conductive formation layer, or other conductive inhomogeneity nearby. The tubular (or mandrel) current $I_m$ may be less sensitive to these kinds of local disturbances in the formation.

At box 312, the method may provide using the first signal comprising tubular current to invert formation resistivity. The extra degree of freedom afforded by the measurement of the tubular (or mandrel) current $I_m$ may be utilized toward inverting the formation resistivity. The full cost function (3) may be used in this inversion.

At box 314, the method may provide using the first signal comprising tubular current to invert a coupling signal. The extra degree of freedom afforded by the measurement of the tubular (or mandrel) current $I_m$ may be utilized toward inverting the coupling signal. The coupling signal may be defined as the part of the received signal caused solely by the mandrel current. Again, the full cost function (3) may be used in this inversion.

Figure 4:
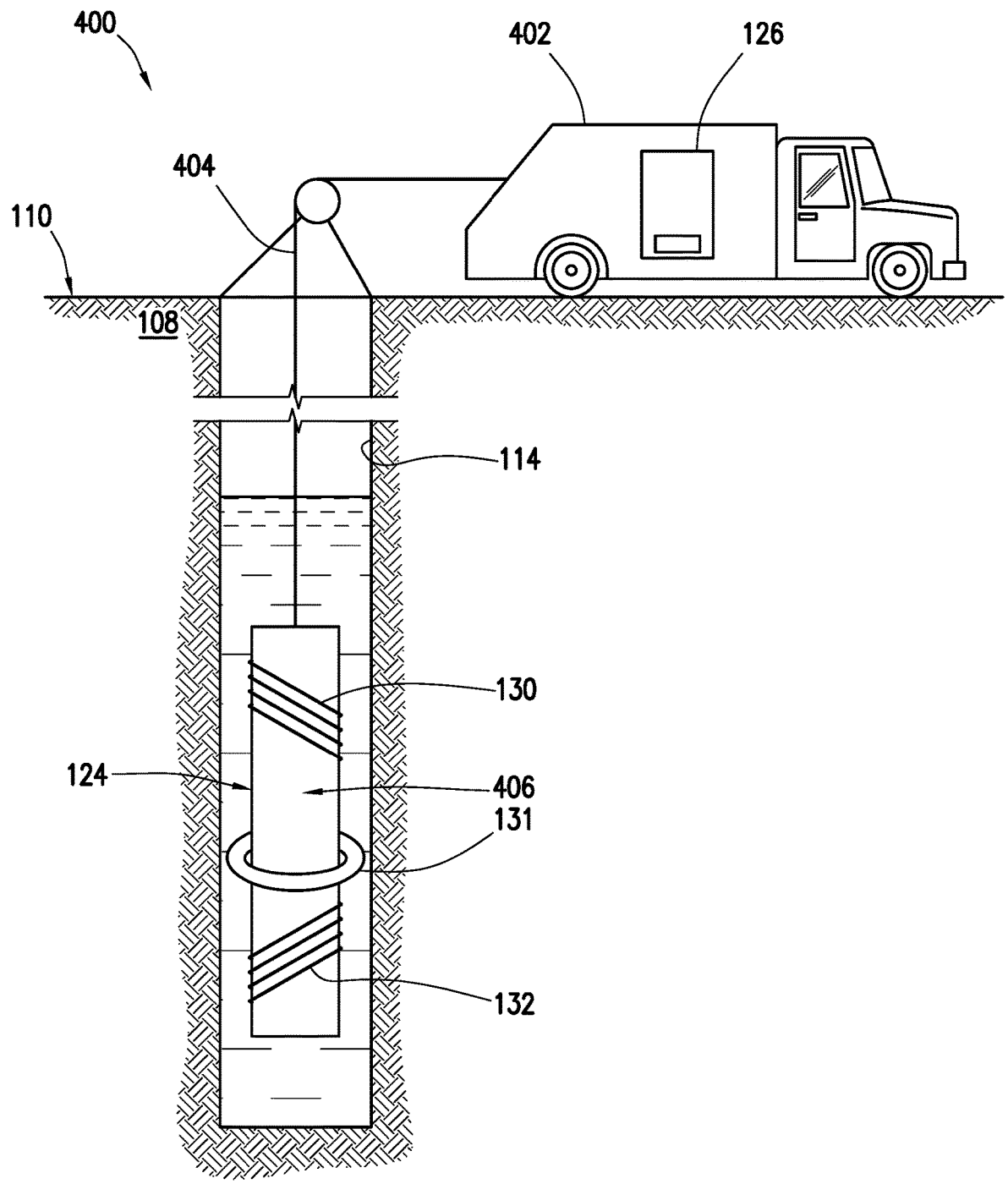
FIG. 4 illustrates an example of a wireline system.

FIG. 4 illustrates an example of a wireline system 400. Wireline system 400 may comprise a recovery vehicle 402, wireline 404, and/or electromagnetic induction tool 124. Recovery vehicle 402 may be disposed at surface 110 of second wellbore 114. Recovery vehicle 402 may include a spool (not shown) for raising and lowering wireline 404 in second wellbore 114. As illustrated, electromagnetic induction tool 124 may be coupled to wireline 404, for example, at a distal end of wireline 404. electromagnetic induction tool 124 may include transmitter 130, toroid receiver 131, and second receiver 132. Transmitter 130, toroid receiver 131, and second receiver 132 may be coupled to tubular 406, which may comprise a mandrel or other suitable tubular. In examples, tubular 406 may be insulated to minimize the azimuthal currents on electromagnetic induction tool 124, thus reducing the direct signal between transmitter 130 and toroid receiver 131 and second receiver 132. Signals from toroid receiver 131 and second receiver 132 may be transmitted to an information handling system 126, which may be disposed on recovery vehicle 402, for example. It should be understood that other types of wireline systems may be employed, including those in which the wireline is disposed from a spool that is installed at surface 110 instead of being located on a recovery vehicle 402. Specific information about subterranean formation 108, such as resistivity, may be inferred from analysis of the signal from toroid receiver 131 and/or second receiver 132. In certain examples, a wireline log may be developed from the signal that includes information about subterranean formation 108, such as formation resistivity.

Figure 5:
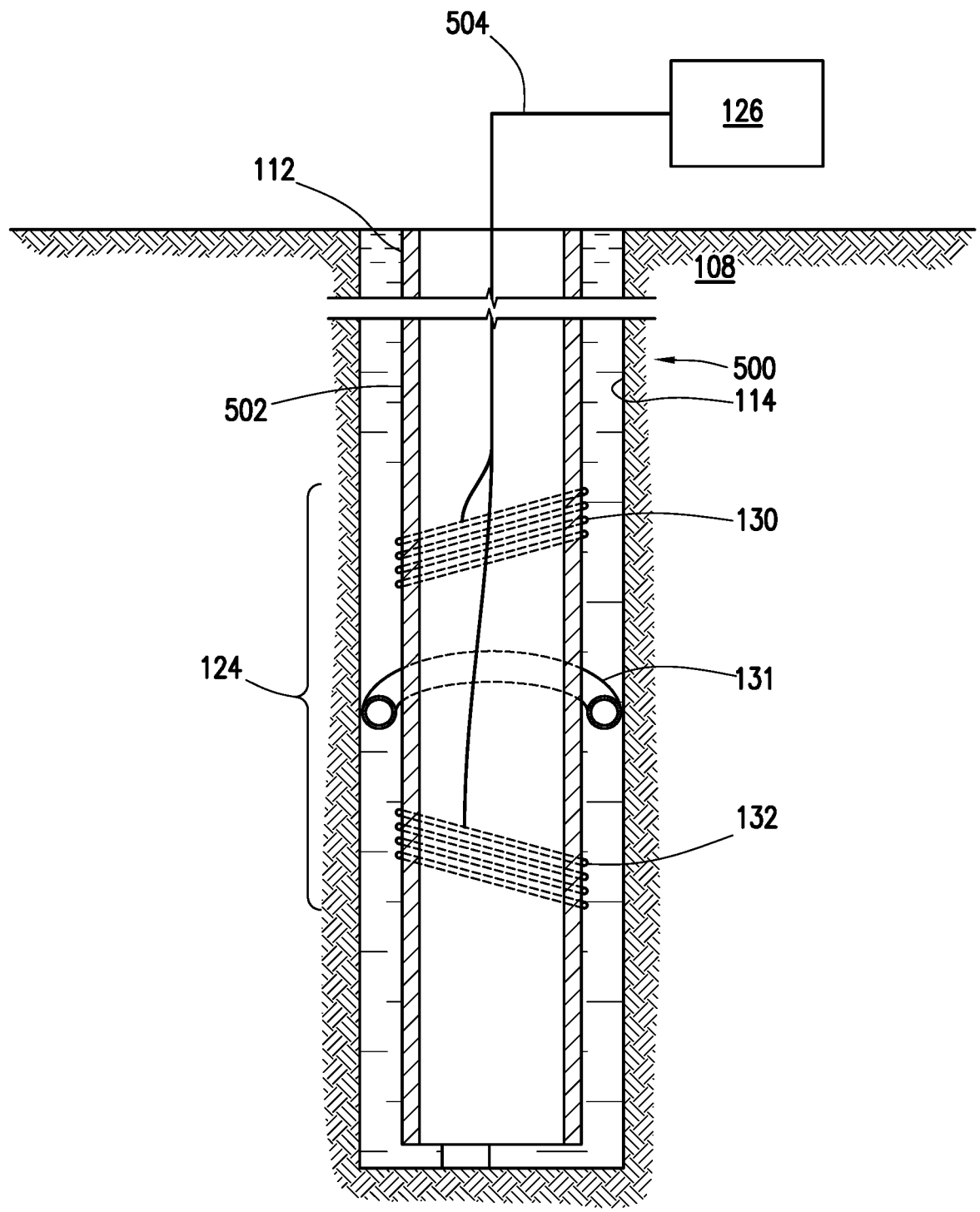
FIG. 5 illustrates an example of a permanent monitoring system.

FIG. 5 illustrates an example of a permanent monitoring system 500 in which electromagnetic induction tool 124 has been incorporated. As will be appreciated, permanent monitoring system 500 may be used to monitor formation properties, including approaching flood fronts (not illustrated). In examples, permanent monitoring system 500 may comprise a conductive member 112, which may also be magnetic, disposed within second wellbore 114 penetrating subterranean formation 108. Permanent monitoring system 500 may also comprise electromagnetic induction tool 124, which may comprise transmitter 130, toroid receiver 131, and second receiver 132. Transmitter 130, toroid receiver 131, and second receiver 132 may be coupled to tubular 502. As illustrated, tubular 502 may be section of conductive and magnetic member 112, such as one or more casing joints or the like. In examples, tubular 502 may be insulated to minimize the azimuthal currents on electromagnetic induction tool 124, thus reducing the direct signal between transmitter 130, toroid receiver 131, and second receiver 132. Information handling system 126 may connect to transmitter 130 and/or toroid receiver 131 and/or second receiver 132 through communication link 504. Signals from toroid receiver 131 and second receiver 132 may be transmitted to information handling system 126 by way of communication link 504. Specific information about subterranean formation 108, such as resistivity, approaching flood front, etc., may be inferred from analysis of the signal from toroid receiver 131 and/or second receiver 132.

A method may comprise introducing a current through a transmitter into a subterranean formation, wherein the transmitter is a component of an electromagnetic induction tool disposed in a wellbore, wherein the electromagnetic induction tool may comprises the transmitter, a toroid receiver, and a second receiver comprising a coil or electrode, wherein the transmitter, the toroid receiver, and the second receiver are disposed on a tubular; measuring a first signal utilizing the toroid receiver, wherein the first signal comprises a tubular current; measuring a second signal utilizing the receiver; and determining at least one downhole parameter utilizing the first signal and the second signal. The tubular may be a mandrel, a casing joint, or a bottom hole assembly. The at least one downhole parameter may comprise a formation parameter. The at least one downhole parameter may comprise a ranging parameter to a target wellbore. The method may further comprise considering a downhole model, wherein the downhole model comprises a modeled tubular current; and solving an inversion to provide the at least one downhole parameter, wherein the inversion minimizes a difference between the modeled tubular current signal and the first signal and minimizes a difference between a modeled receiver signal for the receiver and the second signal. The at least one downhole parameter may be determined using a ratio of the second signal and the first signal. The method may further comprise using modeling to determine an effect of the first signal on the second signal; subtracting the effect from the second signal to obtain a corrected second signal; and using the corrected second signal in the step of determining the at least one downhole parameter. The second signal may be measured at a different axial location than the toroid receiver. The frequencies of the first signal and second signal may be above 100 Hz. The measuring a first signal and the measuring of the second signal may be measured at the same frequency. The tubular may be a conductive metallic section of the electromagnetic induction tool, and wherein the toroid receiver may be mounted on the tubular and isolated between a surface of the tubular and wires of the toroid receiver.

A system may comprise an electromagnetic induction tool disposed in a wellbore, wherein the electromagnetic induction tool may comprise a tubular, a transmitter, a toroid receiver, and a second receiver comprising a coil or electrode; wherein the electromagnetic induction tool may be configured to measure a first signal utilizing the toroid receiver, wherein the first signal may be a tubular current; wherein the electromagnetic induction tool may be configured to measure a second signal utilizing the second receiver; and an information handling system, wherein the information handling system may be operable to determine at least one downhole parameter using the first signal and the second signal. The tubular may be a mandrel, a casing joint, or a bottomhole assembly, and wherein the transmitter, toroid receiver, and second receiver may be disposed on the tubular. At least one downhole parameter may be a ranging parameter of a target wellbore. At least one downhole parameter may be a formation parameter. The information handling system may be configured to consider a downhole model, wherein the downhole model may comprise a modeled tubular current; and wherein the information handling system may be operable to solve an inversion wherein the inversion may minimize a difference between the modeled tubular current signal and the first signal and may minimize a difference between a modeled receiver signal for the second receiver and the second signal. The second receiver and the toroid receiver may be located at different axial locations. The electromagnetic induction tool may be configured to measure the first signal and second signal at a frequency of above 100 Hz. The electromagnetic induction tool may be configured to measure the first signal and second signal at the same frequency. The tubular may be a conductive metallic section of the electromagnetic induction tool, and wherein the toroid receiver may be mounted on the tubular and isolated between a surface of the tubular and wires of the toroid receiver.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    introducing a current through a transmitter into a subterranean formation, wherein the transmitter is a component of an electromagnetic induction tool disposed in a wellbore, wherein the electromagnetic induction tool comprises the transmitter, a toroid receiver, and a second receiver comprising a coil or electrode, wherein the transmitter, the toroid receiver, and the second receiver are disposed on a tubular;
    measuring a first signal utilizing the toroid receiver, wherein the first signal comprises a tubular current;
    measuring a second signal utilizing the second receiver;
    determining at least one downhole parameter utilizing the first signal and the second signal;
    considering a downhole model, wherein the downhole model comprises a modeled tubular current signal; and
    solving an inversion to provide the at least one downhole parameter, wherein the inversion minimizes a difference between the modeled tubular current signal and the first signal and minimizes a difference between a modeled receiver signal for the second receiver and the second signal.

2. The method of claim 1, wherein the tubular is a mandrel, a casing joint, or a bottom hole assembly.

3. The method of claim 1, wherein the at least one downhole parameter comprises a formation parameter.

4. The method of claim 1, wherein the at least one downhole parameter comprises a ranging parameter to a target wellbore.

5. The method of claim 1, wherein the at least one downhole parameter is determined using a ratio of the second signal and the first signal.

6. The method of claim 5, further comprising using modeling to determine an effect of the first signal on the second signal; subtracting the effect from the second signal to obtain a corrected second signal; and using the corrected second signal in the determining the at least one downhole parameter.

7. The method of claim 1, wherein the second signal is measured at a different axial location than the toroid receiver.

8. The method of claim 1, wherein frequencies of the first signal and second signal are above 100 Hz.

9. The method of claim 1, wherein the measuring the first signal and the measuring the second signal are measured at the same frequency.

10. The method of claim 1, wherein the tubular is a conductive metallic section of the electromagnetic induction tool, and wherein the toroid receiver is mounted on the tubular and isolated between a surface of the tubular and wires of the toroid receiver.

11. A system comprising:
    an electromagnetic induction tool disposed in a wellbore, wherein the electromagnetic induction tool comprises a tubular, a transmitter, a toroid receiver, and a second receiver comprising a coil or electrode;
    wherein the electromagnetic induction tool is configured to measure a first signal utilizing the toroid receiver, wherein the first signal is a tubular current;
    wherein the electromagnetic induction tool is configured to measure a second signal utilizing the second receiver; and
    an information handling system, wherein the information handling system is operable to:
        determine at least one downhole parameter using the first signal and the second signal;
        consider a downhole model, wherein the downhole model comprises a modeled tubular current signal; and
        solve an inversion wherein the inversion minimizes a difference between the modeled tubular current signal and the first signal and minimizes a difference between a modeled receiver signal for the second receiver and the second signal.

12. The system of claim 11, wherein the tubular is a mandrel, a casing joint, or a bottomhole assembly, and wherein the transmitter, toroid receiver, and second receiver are disposed on the tubular.

13. The system of claim 11, wherein the at least one downhole parameter is a ranging parameter of a target wellbore.

14. The system of claim 11, wherein the at least one downhole parameter is a formation parameter.

15. The system of claim 11, wherein the second receiver and the toroid receiver are located at different axial locations.

16. The system of claim 11, wherein electromagnetic induction tool is configured to measure the first signal and the second signal at a frequency of above 100 Hz.

17. The system of claim 11, wherein electromagnetic induction tool is configured to measure the first signal and the second signal at the same frequency.

18. The system of claim 11, wherein the tubular is a conductive metallic section of the electromagnetic induction tool, and wherein the toroid receiver is mounted on the tubular and isolated between a surface of the tubular and wires of the toroid receiver.

\* \* \* \* \*